(12) United States Patent
Takatani

(10) Patent No.: US 8,755,537 B2
(45) Date of Patent: Jun. 17, 2014

(54) MICROPHONE UNIT AND SOUND COLLECTING DEVICE

(75) Inventor: Tomoya Takatani, Toyota (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 286 days.

(21) Appl. No.: 13/177,219

(22) Filed: Jul. 6, 2011

(65) Prior Publication Data

US 2012/0087513 A1 Apr. 12, 2012

Related U.S. Application Data

(63) Continuation of application No. PCT/JP2010/006016, filed on Oct. 7, 2010.

(51) Int. Cl.
*H04R 3/00* (2006.01)
*H04R 29/00* (2006.01)
*H04R 25/00* (2006.01)

(52) U.S. Cl.
USPC .............................. 381/92; 381/58; 381/162

(58) Field of Classification Search
CPC .. H04R 3/005; H04R 1/406; H04R 2201/401; H04R 2201/403
USPC .............................. 381/92, 58, 94.9, 162, 178
See application file for complete search history.

(56) References Cited

U.S. PATENT DOCUMENTS

2006/0262943 A1* 11/2006 Oxford ........................... 381/92
2012/0275621 A1* 11/2012 Elko ............................... 381/92

FOREIGN PATENT DOCUMENTS

| JP | 05-308695 A | 11/1993 |
| JP | 2002-171591 A | 6/2002 |
| JP | 2002-344787 A | 11/2002 |
| JP | 2005-057437 A | 3/2005 |
| JP | 2008-042754 A | 2/2008 |
| JP | 2008-085613 A | 4/2008 |
| JP | 2010-130114 A | 6/2010 |

OTHER PUBLICATIONS

International Search Report dated Dec. 28, 2010 of PCT/JP2010/006016.

* cited by examiner

*Primary Examiner* — Vivian Chin
*Assistant Examiner* — Douglas Suthers
(74) *Attorney, Agent, or Firm* — Kenyon & Kenyon LLP

(57) ABSTRACT

To provide a microphone unit capable of acquiring a target sound with high accuracy. A microphone unit in accordance with an exemplary embodiment of the present invention includes a plurality of microphones, a microphone substrate on which the plurality of microphones are mounted, and a vibration observation device disposed at roughly a center of gravity of a shape that is formed by connecting centers of certain adjacent microphones among the plurality of microphones.

6 Claims, 8 Drawing Sheets

MICROPHONE UNIT AND SOUND COLLECTING DEVICE

This is a continuation of International Application PCT/JP2010/006016, with an international filing date of Oct. 7, 2010, which is hereby incorporated by reference herein its entirety.

TECHNICAL FIELD

The present invention relates to a microphone unit and a sound collecting device.

BACKGROUND ART

In recent years, sound collecting devices using a plurality of microphones have been used in vehicles such as robots and automobiles. By using a sound collecting device in a vehicle, a user can provide instructions to the vehicle in a hands-free fashion.

In such a state, the sound collecting device acquires a target sound by performing signal processing (array process) on observation signals obtained by a plurality of microphones. As the signal processing, for example, a sound source separation process using an independent component analysis, a principal component analysis or the like, or a static or dynamic beam-forming is used.

However, vibrations caused by the motor, the engine, and/or the like of the vehicle as well as vibrations caused by interference with the external environment (such as road surfaces and obstacles) reach the microphones. As a result, vibration sounds are mixed as a noise into the observation signals obtained by the microphones, thus making it difficult to acquire the target sound at a satisfactory level.

Therefore, Patent literatures 1 to 3 disclose techniques to suppress vibration sounds by observing vibrations by using a vibration observation device, generating a vibration signal by carrying out signal processing using the observation result, and subtracting the vibration signal from the observation signal obtained by the microphone for a target sound.

Incidentally, Patent literature 4 discloses a technique in which a plurality of microphones are arranged in a regular triangle configuration.

CITATION LIST

Patent Literature

Patent literature 1: Japanese Unexamined Patent Application Publication No. 2002-344787
Patent literature 2: Japanese Unexamined Patent Application Publication No. 2008-42754
Patent literature 3: Japanese Unexamined Patent Application Publication No. 2008-85613
Patent literature 4: Japanese Unexamined Patent Application Publication No. 2010-130114

SUMMARY OF INVENTION

Technical Problem

Theoretically, the techniques disclosed in Patent literatures 1 to 3 can suppress vibration sounds. However, when the vibration observation device is located at a distant place from the microphone or when the distance between the vibration observation device and each of a plurality of microphones is significantly different from one another, the accuracy in the vibration sound suppression deteriorates. Therefore, there is a possibility that the techniques disclosed in Patent literatures 1 to 3 cannot acquire the target sound with high accuracy.

The present invention has been made to solve a problem like this, and an object thereof is to provide a microphone unit and a sound collecting device capable of acquiring a target sound with high accuracy.

Solution to Problem

A microphone unit in accordance with the present invention includes: a plurality of microphones; a microphone substrate on which the plurality of microphones are mounted; and a vibration observation device disposed at roughly a center of gravity of a shape that is formed by connecting centers of certain adjacent microphones among the plurality of microphones.

The vibration observation device is preferably mounted on the microphone substrate.

The shape that is formed by connecting centers of certain adjacent microphones among the plurality of microphones is preferably a regular polygon.

The regular polygon is preferably a regular triangle.

An additional microphone is preferably disposed at a middle place between adjacent microphones in the certain microphones forming vertices of the regular triangle.

A sound collecting device in accordance with the present invention includes: the above-described microphone unit; and a processing unit that processes an observation signal supplied from the plurality of microphones of the microphone unit.

Advantageous Effects of Invention

As explained above, in accordance with the present invention, a microphone unit and a sound collecting device capable of acquiring a target sound with high accuracy can be provided.

DESCRIPTION OF EMBODIMENTS

Best modes for carrying out the present invention are explained hereinafter with reference to the attached drawings. However, the present invention is not limited to the exemplary embodiments shown below. Further, the following description and the drawings are simplified as appropriate for clarifying the explanation.

Figure 1:
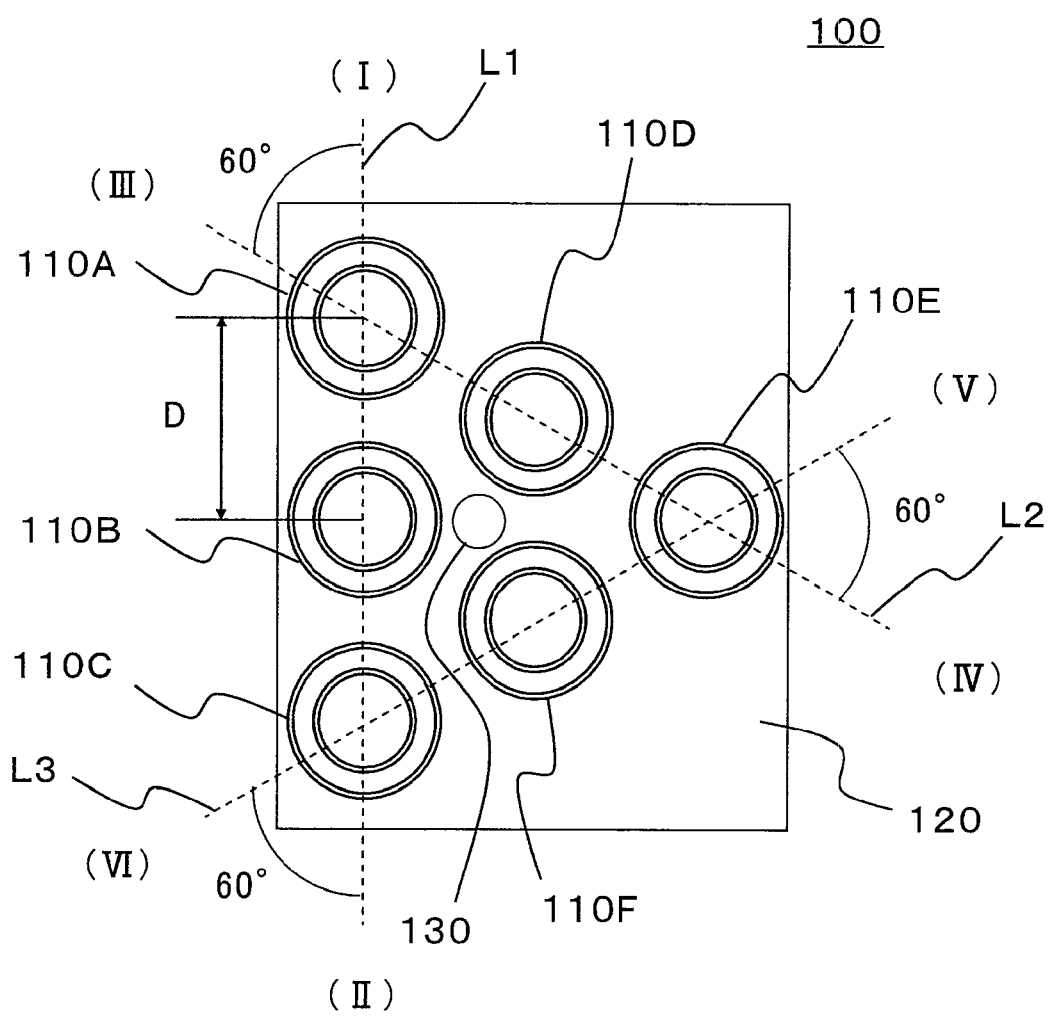
FIG. 1 is a plane view schematically showing a microphone unit in accordance with an exemplary embodiment of the present invention.

As shown in FIG. 1, a microphone unit 100 in accordance with this exemplary embodiment includes six microphones 110A to 110F, a microphone substrate 120, a vibration observation device 130, and the like. Similarly to typical microphones, each of the microphones 110A to 110F receives a human voice or an ambient sound on its diaphragm, converts the resulting vibration of the diaphragm into an output voltage, and outputs the output voltage, for example, to an amplification unit or the like.

The microphones 110A to 110F are mounted on the microphone substrate 120. The microphones 110A to 110F face upward. The microphones 110A to 110F are arranged in such a manner that their centers are located on the three sides of a regular triangle.

The arrangement of the microphones 110A to 110F is explained hereinafter in a more detailed manner. The three sides of the regular triangle are disposed on an imaginary straight-line L1, an imaginary straight-line L2, and an imaginary straight-line L3 respectively. That is, the imaginary straight-lines L1 to L3 form the regular triangle. The imaginary straight-lines L1 to L3 are on the upper surface of the microphone substrate 120. The centers of the microphones 110A to 110C are located on the imaginary straight-line L1. The microphones 110A to 110C are arranged at regular intervals. The microphone 110B is located at the middle place between the microphone 110A and the microphone 110C.

Therefore, the centers of the microphones 110A and 110C are located at respective vertices of the regular triangle. As described above, the microphones 110A to 110C are arranged in a row on the imaginary straight-line L1. The microphones 110A to 110C located on the imaginary straight-line L1 constitute CH1 (channel 1) having a directivity in a direction (I) and CH2 having a directivity in a direction (II).

The imaginary straight-line L2 is inclined at 60° with respect to the imaginary straight-line L1. The imaginary straight-line L1 and the imaginary straight-line L2 intersect each other at the center of the microphone 110A. The microphones 110A, 110D and 110E are arranged on the imaginary straight-line L2.

That is, the centers of the microphones 110A, 110D and 110E are located on the imaginary straight-line L2. The microphones 110A, 110D and 110E are arranged at regular intervals. The microphone 110D is located at the middle place between the microphone 110A and the microphone 110E.

Therefore, the center of the microphone 110E is located at a vertex of the regular triangle. As described above, the microphones 110A, 110D and 110E are arranged in a row on the imaginary straight-line L2. The microphones 110A, 110D and 110E located on the imaginary straight-line L2 constitute CH3 having a directivity in a direction (III) and CH4 having a directivity in a direction (IV).

The imaginary straight-line L3 is inclined at 60° with respect to the imaginary straight-lines L1 and L2. The imaginary straight-line L1 and the imaginary straight-line L3 intersect each other at the center of the microphone 110C. The imaginary straight-line L2 and the imaginary straight-line L3 intersect each other at the center of the microphone 110E. The microphones 110C, 110F and 110E are arranged on the imaginary straight-line L3.

That is, the centers of the microphones 110C, 110E and 110E are located on the imaginary straight-line L3. The microphones 110C, 110F and 110E are arranged at regular intervals. The microphone 110F is located at the middle place between the microphone 110C and the microphone 110E.

Therefore, the centers of the microphones 110C and 110E are located at respective vertices of the regular triangle. As described above, the microphones 110C, 110F and 110E are arranged in a row on the imaginary straight-line L3. The microphones 110C, 110F and 110E located on the imaginary straight-line L3 constitute CH5 having a directivity in a direction (V) and CH6 having a directivity in a direction (VI).

The microphone substrate 120 is a wiring substrate. On the microphone substrate 120, the microphones 110A to 110F and the vibration observation device 130 are mounted. The microphone substrate 120 is electrically connected to an amplification unit, for example, and outputs observation signals obtained by the microphones 110A to 110F and an observation signal obtained by the vibration observation device 130 to the amplification unit.

The vibration observation device 130 is equipped with a vibration sensor such as an acceleration sensor. The vibration observation device 130 is mounted on the microphone substrate 120. The vibration observation device 130 is disposed at roughly the center of gravity of a regular triangle that is formed by connecting the centers of the microphones 110A to 110F.

Figure 2:
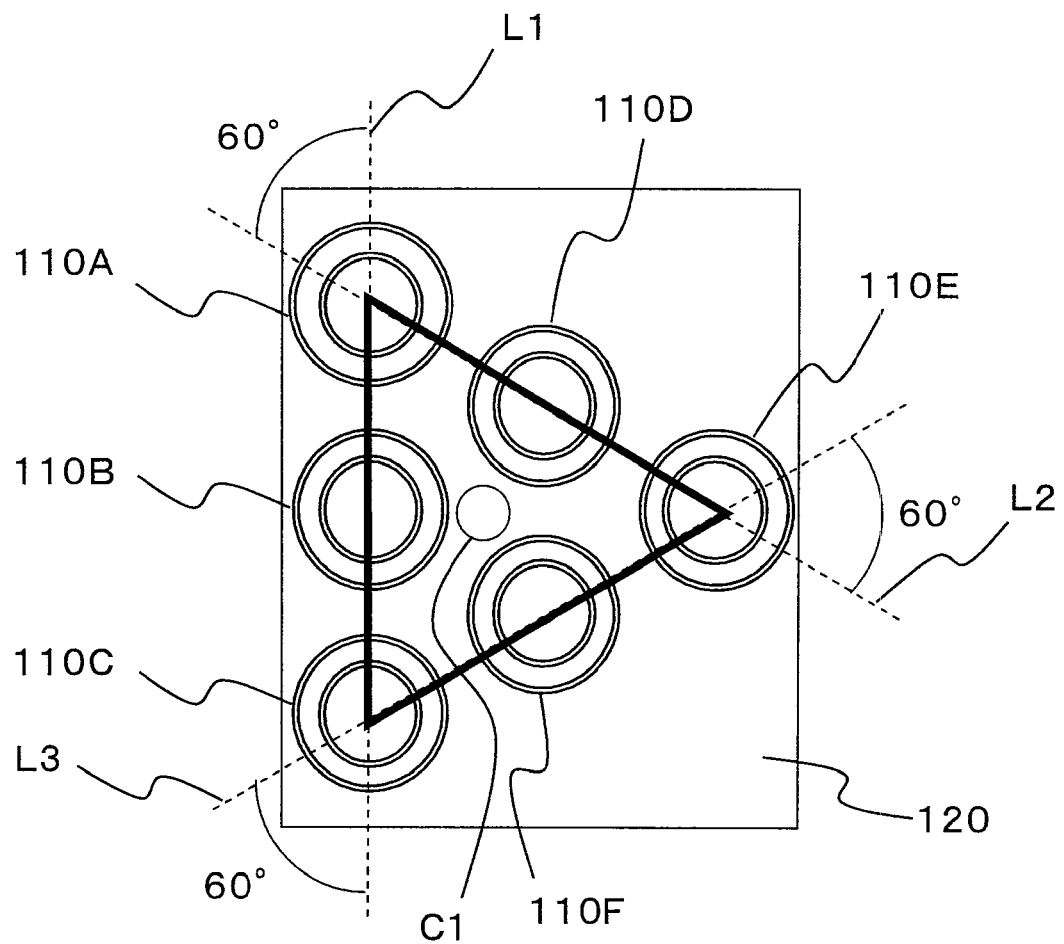
FIG. 2 is a figure for explaining the center of gravity of a regular triangle that is formed by connecting the centers of certain microphones in a microphone unit in accordance with an exemplary embodiment of the present invention.

As shown in FIG. 2, by connecting the centers of certain microphones 110A, 110C and 110E among the six microphones 110A to 110F, a regular triangle whose vertices are located at the centers of the microphones 110A, 110C and 110E is formed. The center of gravity of this triangle is represented by "C1".

Figure 3:
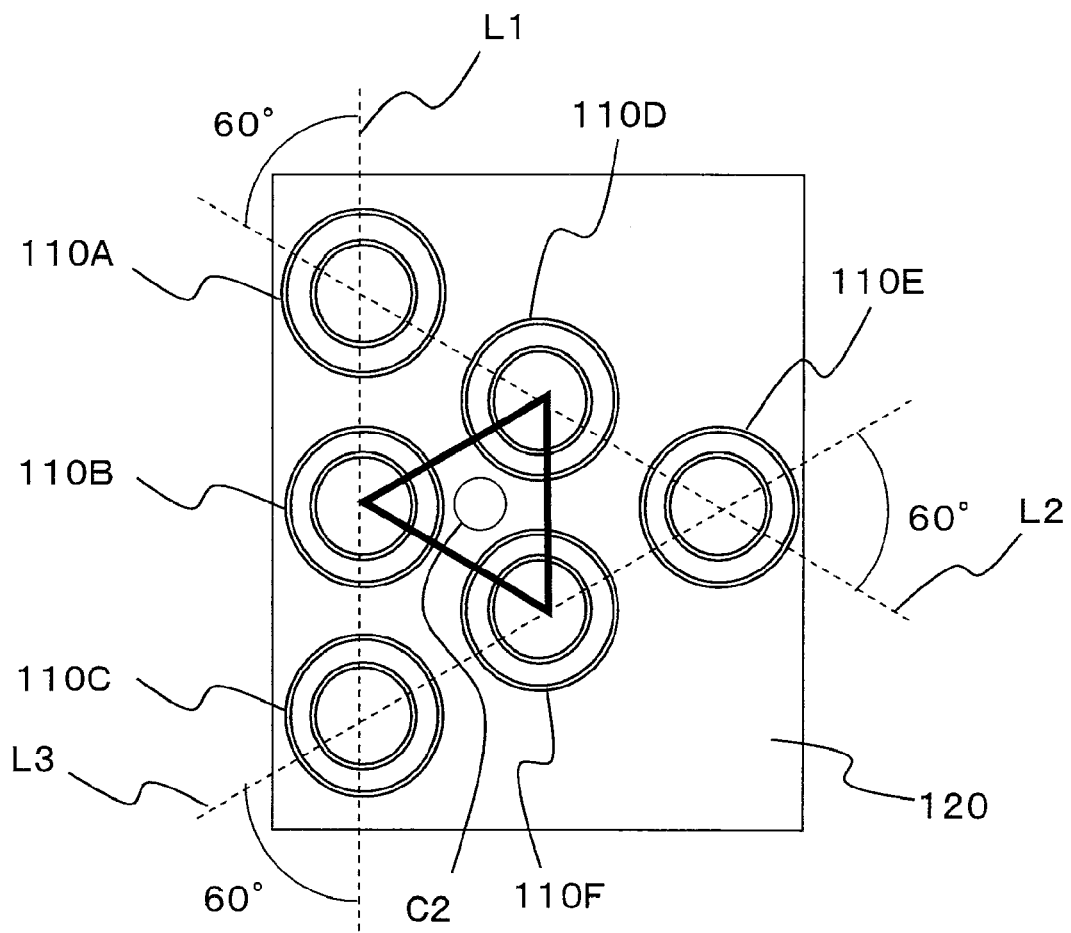
FIG. 3 is a figure for explaining the center of gravity of a regular triangle that is formed by connecting the centers of different certain microphones in a microphone unit in accordance with an exemplary embodiment of the present invention.

Meanwhile, as shown in FIG. 3, when the centers of the microphones 110B, 110D and 110F, among the six microphones 110A to 110F, are connected, a regular triangle whose vertices are located at the centers of the microphones 110B, 110D and 110F is formed. The center of gravity of this triangle is represented by "C2".

Figure 4:
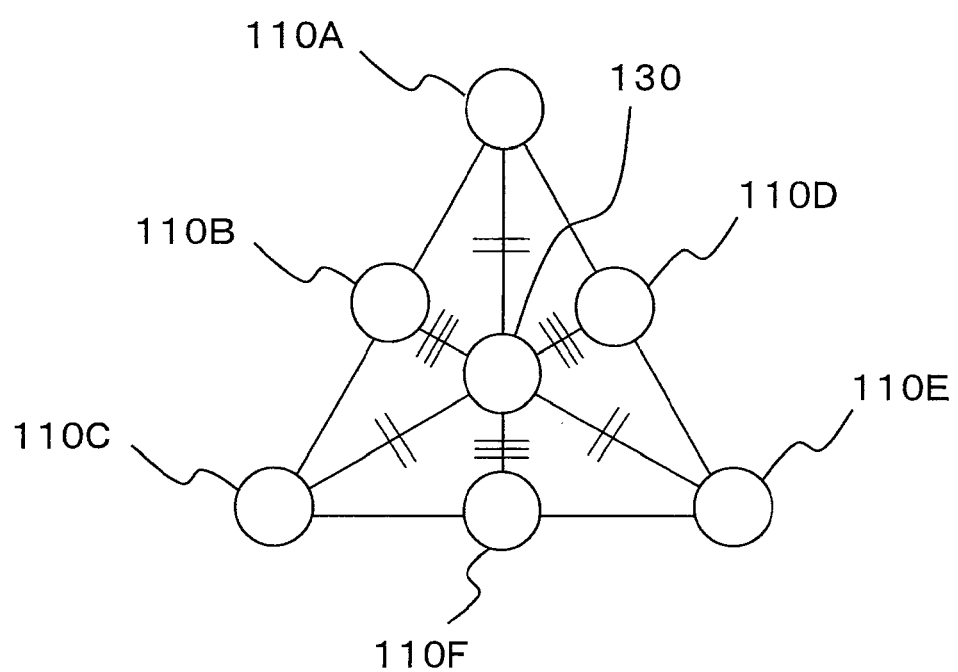
FIG. 4 is a figure for explaining characteristics of a position at which a vibration observation device is disposed in a microphone unit in accordance with an exemplary embodiment of the present invention.

Note that the positions of the centers of gravity C1 and C2 coincide with each other. As described above, the vibration observation device 130 is disposed at the coincident centers of gravity C1 and C2 in this exemplary embodiment. As a result, as shown in FIG. 4, the vibration observation device 130 can be disposed at such a position that the distances between the center of the vibration observation device 130 and the centers of the microphones 110A, 110C and 110E are equal to each other and are the shortest. In addition, the vibration observation device 130 can be also disposed at such a position that the distances between the center of the vibration observation device 130 and the centers of the microphones 110B, 110D and 110F are equal to each other and are the shortest.

That is, the distance between the center of the vibration observation device 130 and the center of the microphone 110A, the distance between the center of the vibration observation device 130 and the center of the microphone 110C, and the distance between the center of the vibration observation device 130 and the center of the microphone 110E are equal to each other and are the shortest. Further, the distance between the center of the vibration observation device 130 and the center of the microphone 110B, the distance between the center of the vibration observation device 130 and the center of the microphone 110D, and the distance between the center of the vibration observation device 130 and the center of the microphone 110F are equal to each other and are the shortest.

Figure 5:
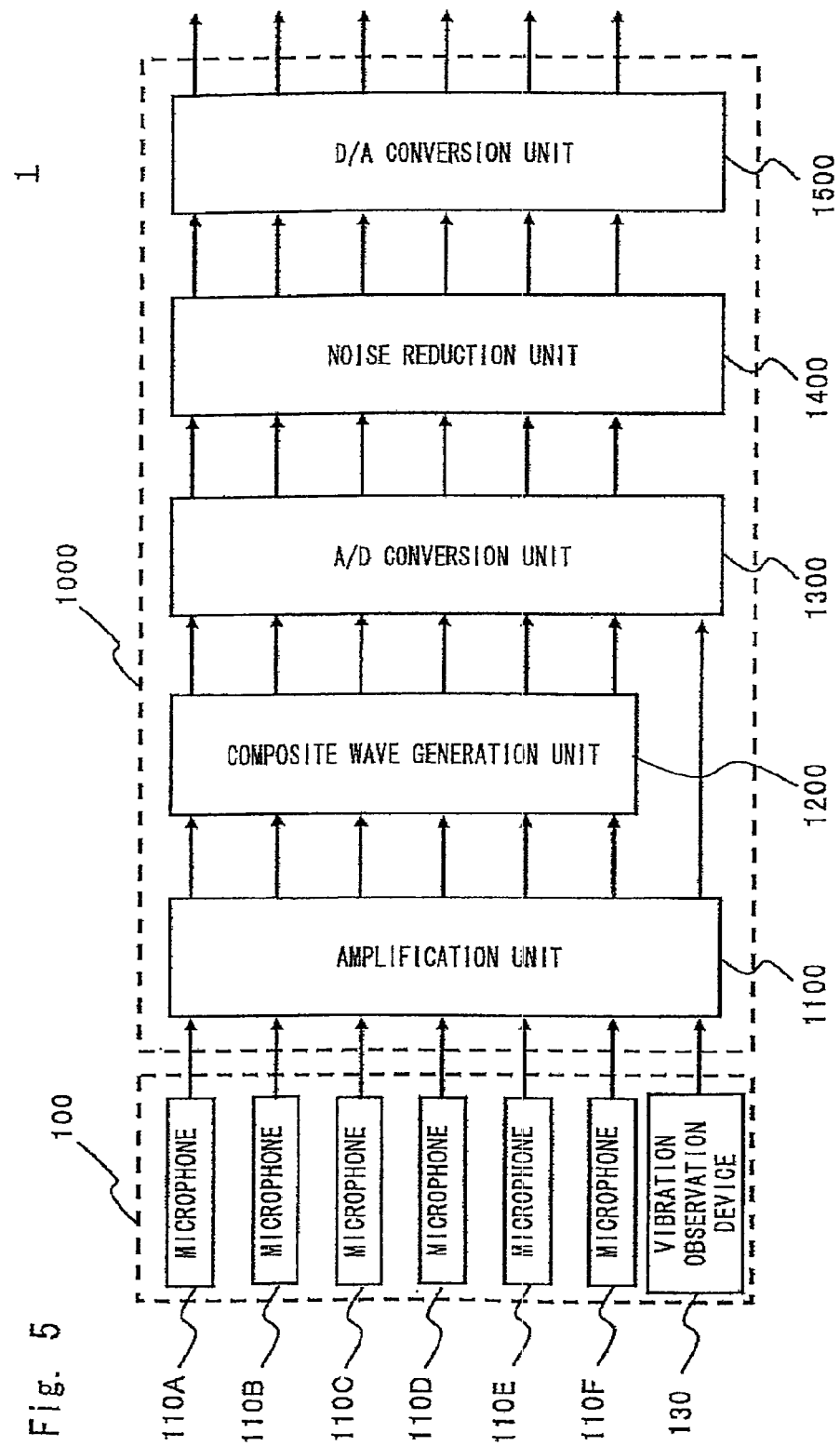
FIG. 5 is a block diagram showing a control system of a sound collecting device in accordance with an exemplary embodiment of the present invention.

The microphone unit 100 having the configuration like this is installed, for example, in the head or the like of a robot as a component for a sound collecting device. As shown in FIG. 5, the sound collecting device 1 includes a microphone unit 100 and a processing unit 1000.

The processing unit 1000 includes an amplification unit 1100, a composite wave generation unit 1200, an A/D conversion unit 1300, a noise reduction unit 1400, and a D/A conversion unit 1500. The amplification unit 1100 includes an amplifier. Observation waves indicating output voltages (observation signals) supplied from the microphones 110A to 110F are input to the amplification unit 1100. The amplification unit 1100 amplifies the observation waves of the microphones 110A to 110F. Further, the amplification unit 1100 outputs each of the amplified observation waves (note that the amplified observation wave may be also referred to simply as "observation wave" for simplifying the following explanation) to the composite wave generation unit 1200. Note that the amplification unit 1100 is preferably equipped with a filter and the like. That is, the amplification unit 1100 outputs those amplified observation waves after filtering out a predetermined frequency band(s) from the amplified observation waves.

The composite wave generation unit 1200 generates composite waves for CH1 to CH6. That is, observation waves for the respective microphones are input from the amplification unit 1100 to the composite wave generation unit 1200. The composite wave generation unit 1200 generates, for each of the predefined channels, a composite wave of microphones constituting that channel.

In this exemplary embodiment, the microphone 110B is defined as a reference microphone for CH1 and CH2. The microphone 110D is defined as a reference microphone for CH3 and CH4. The microphone 110F is defined as a reference microphone for CH5 and CH6.

To generate a composite wave for CH1, the composite wave generation unit 1200 delays the observation wave of the microphone 100A by an amount obtained by dividing the distance D between the center of the microphone 100A and the center of the microphone 100B by the speed of sound (arrival time difference). Meanwhile, it advances the observation wave from the microphone 100C by the amount obtained by dividing the distance D between the center of the microphone 100C and the center of the microphone 100B by the speed of sound. In this state, a sound coming from the direction (I), for example, is observed in the order of the microphones 100A, 110B and 110C. For this sound, the observation waves of the microphones 110A and 110C are processed in such a manner that their arrival times roughly coincide with that of the observation wave of the microphone 110B. The composite wave generation unit 1200 adds up the observation waves of the microphones 110A and 110C and the observation wave of the microphone 110B processed in the above-described manner, and thereby generates a composite wave for CH1. The composite wave generation unit 1200 divides this composite wave for CH1 by the number of the microphones constituting CH1 (i.e., three), and outputs the divided observation wave to the A/D conversion unit 1300.

Further, to generate a composite wave for CH2, the composite wave generation unit 1200 delays the observation wave of the microphone 100C by an amount obtained by dividing the distance D by the speed of sound. Meanwhile, the composite wave generation unit 1200 advances the observation wave of the microphone 100A by the amount obtained by dividing the distance D by the speed of sound. In this state, a sound coming from the direction (I), for example, is observed in the order of the microphones 100A, 110B and 110C. For this sound, the observation waves of the microphones 110C and 110A are processed in such a manner that their arrival times get further apart from that of the observation wave of the microphone 110B. Therefore, even when the processed observation waves of the microphones 110C and 110A and the observation wave of the microphone 110B are added up, the sound hardly increases in strength. The composite wave generation unit 1200 adds up the observation waves of the microphones 110C and 110A and the observation wave of the microphone 110B processed in the above-described manner, and thereby generates a composite wave for CH2. The composite wave generation unit 1200 divides this composite wave for CH2 by the number of the microphones constituting CH2 (i.e., three), and outputs the divided observation wave to the A/D conversion unit 1300.

Further, to generate a composite wave for CH3, the composite wave generation unit 1200 delays the observation wave of the microphone 100A by an amount obtained by dividing the distance D by the speed of sound. Meanwhile, the composite wave generation unit 1200 advances the observation wave of the microphone 100E by the amount obtained by dividing the distance D by the speed of sound. In this state, a sound coming from the direction (I), for example, is observed in the order of the microphones 100A, 110D and 110E. For this sound, the observation waves of the microphones 110A and 110E are processed in such a manner that their arrival times get closer to that of the observation wave of the microphone 110D. However, the difference between the time at which the sound coming from the direction (I) arrives at the microphone 110A or 110E and the time at which the sound arrives at the microphone 110D is different in comparison to the difference between the time at which the sound coming from the direction (I) arrives at the microphone 110A or 110C and the time at which the sound arrives at the microphone 110B. Therefore, even when the processed observation waves of the microphones 110A and 110E and the observation wave of the microphone 110D are added up, the observation waves do not coincide with each other unlike the processing for CH1. Therefore, the increase in sound strength is small. The composite wave generation unit 1200 adds up the observation waves of the microphones 110A and 110E and the observation wave of the microphone 110D processed in the above-described manner, and thereby generates a composite wave for CH3. The composite wave generation unit 1200 divides this composite wave for CH3 by the number of the microphones constituting CH3 (i.e., three), and outputs the divided observation wave to the A/D conversion unit 1300.

Further, to generate a composite wave for CH4, the composite wave generation unit 1200 delays the observation wave of the microphone 100E by an amount obtained by dividing the distance D by the speed of sound. Meanwhile, the composite wave generation unit 1200 advances the observation wave of the microphone 100A by the amount obtained by dividing the distance D by the speed of sound. In this state, a sound coming from the direction (I), for example, is observed in the order of the microphones 100A, 110D and 110E. For this sound, the observation waves of the microphones 110E and 110A are processed in such a manner that their arrival times get further apart from that of the observation wave of the microphone 110D. Therefore, even when the processed observation waves of the microphones 110E and 110A and the observation wave of the microphone 110D are added up, the observation waves do not coincide with each other unlike the processing for CH1. Therefore, the increase in sound strength is small. The composite wave generation unit 1200 adds up the observation waves of the microphones 110E and 110A and the observation wave of the microphone 110D processed in the above-described manner, and thereby generates a composite wave for CH4. The composite wave generation unit 1200 divides this composite wave for CH4 by the number of the microphones constituting CH4 (i.e., three), and outputs the divided observation wave to the A/D conversion unit 1300.

Further, to generate a composite wave for CH5, the composite wave generation unit 1200 delays the observation wave of the microphone 100E by an amount obtained by dividing the distance D by the speed of sound. Meanwhile, the composite wave generation unit 1200 advances the observation wave of the microphone 100C by the amount obtained by dividing the distance D by the speed of sound. In this state, a sound coming from the direction (I), for example, is observed in the order of the microphones 100E, 110F and 110C. For this sound, the observation waves of the microphones 110E and 110C are processed in such a manner that their arrival times get closer to that of the observation wave of the microphone 110F. However, the difference between the time at which the sound coming from the direction (I) arrives at the microphone 110E or 110C and the time at which the sound arrives at the microphone 110F is different in comparison to the difference between the time at which the sound coming from the direction (I) arrives at the microphone 110A or 110C and the time at which the sound arrives at the microphone 110B. Therefore, even when the processed observation waves of the microphones 110E and 110C and the observation wave of the microphone 110F are added up, the observation waves do not coincide with each other unlike the processing for CH1. Therefore, the increase in sound strength is small. The composite wave generation unit 1200 adds up the observation waves of the microphones 110E and 110C and the observation wave of the microphone 110F processed in the above-described manner, and thereby generates a composite wave for CH5. The composite wave generation unit 1200 divides this composite wave for CH5 by the number of the microphones constituting CH5 (i.e., three), and outputs the divided observation wave to the A/D conversion unit 1300.

Further, to generate a composite wave for CH6, the composite wave generation unit 1200 delays the observation wave of the microphone 100C by an amount obtained by dividing the distance D by the speed of sound. Meanwhile, the composite wave generation unit 1200 advances the observation wave of the microphone 100E by the amount obtained by dividing the distance D by the speed of sound. In this state, a sound coming from the direction (I), for example, is observed in the order of the microphones 100E, 110F and 110C. For this sound, the observation waves of the microphones 110C and 110E are processed in such a manner that their arrival times get further apart from that of the observation wave of the microphone 110F. Therefore, even when the processed observation waves of the microphones 110C and 110E and the observation wave of the microphone 110F are added up, the observation waves do not coincide with each other unlike the processing for CH1. Therefore, the increase in sound strength is small. The composite wave generation unit 1200 adds up the observation waves of the microphones 110C and 110E and the observation wave of the microphone 110F processed in the above-described manner, and thereby generates a composite wave for CH6. The composite wave generation unit 1200 divides this composite wave for CH6 by the number of the microphones constituting CH6 (i.e., three), and outputs the divided observation wave to the A/D conversion unit 1300.

By generating a composite wave for each of CH1 to CH6 in this manner, CH1 to CH6 have their respective directivities. For example, assume that: the direction (I) is set at 0°; the direction (II) is set at 180°; the direction (III) is set at 300°; the direction (IV) is set at 120°; the direction (V) is set at 60°; and the direction (VI) is set at 240°. Then, CH1 has a directivity of roughly 300° to 60°. CH2 has a directivity of roughly 120° to 240°. CH3 has a directivity of roughly 240° to 0°. CH4 has a directivity of roughly 60° to 180°. CH5 has a directivity of roughly 0° to 120°. CH6 has a directivity of roughly 180 to 300°.

Each of the composite waves for CH1 to CH6 is input from the composite wave generation unit 1200 to the A/D conversion unit 1300. The A/D conversion unit 1300 converts each of the composite waves for CH1 to CH6 from an analog form to a digital form. Further, an observation wave from the vibration observation device 130 is also input to the vibration observation device 130. The A/D conversion unit 1300 also converts the observation wave of the vibration observation device 130 from an analog form to a digital form. The A/D conversion unit 1300 outputs the composite waves for CH1 to CH6 and the observation wave of the vibration observation device 130, all of which were converted from the analog form into the digital form, to the noise reduction unit 1400.

Figure 6:
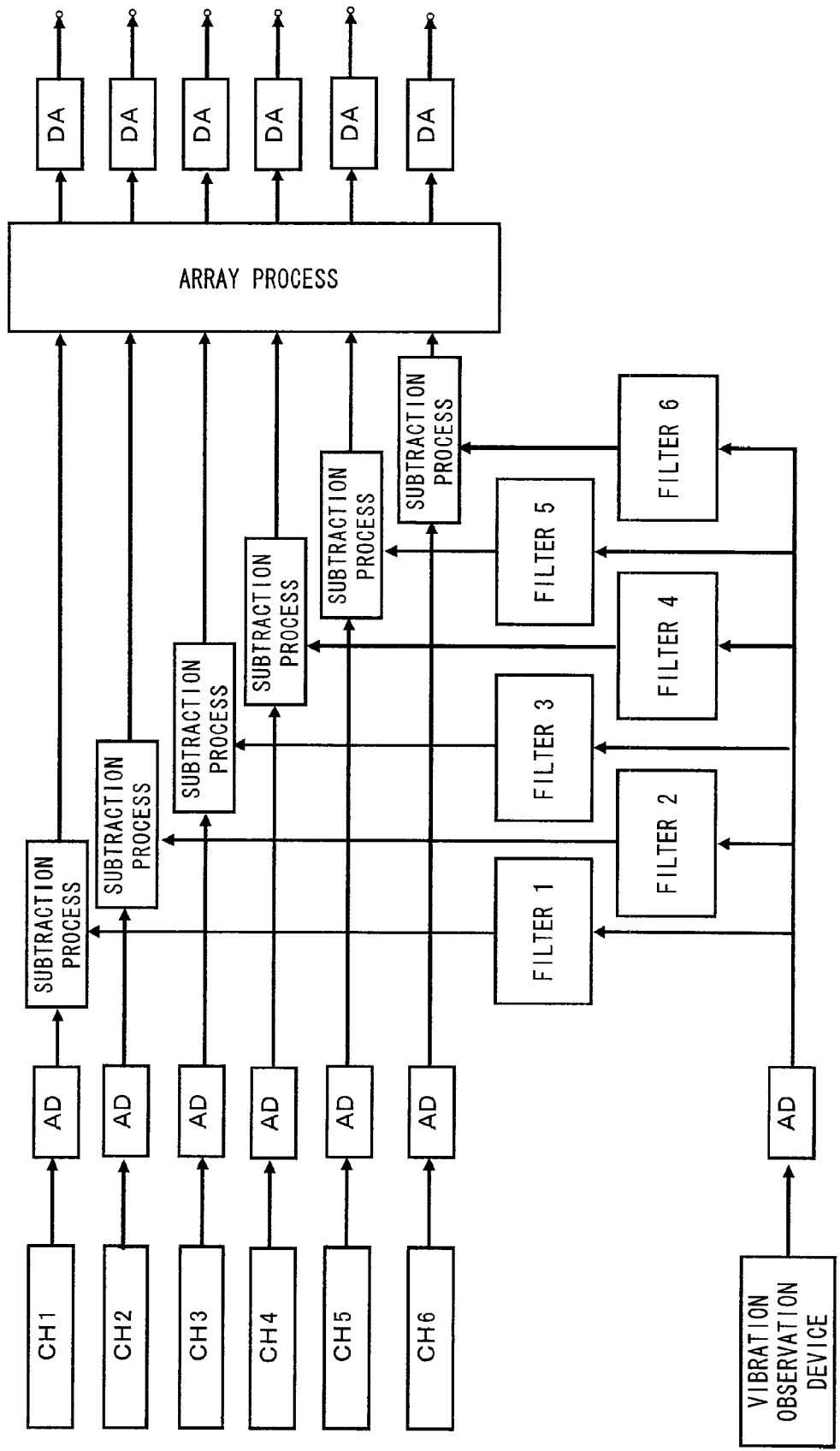
FIG. 6 shows a process flow of a noise reduction unit in a sound collecting device in accordance with an exemplary embodiment of the present invention.

The noise reduction unit 1400 removes noise components from the composite waves for CH1 to CH6. FIG. 6 shows a process flow of the noise reduction unit 1400. The composite waves for CH1 to CH6 and the observation wave of the vibration observation device 130, which were converted from the analog form into the digital form, are input from the A/D conversion unit 1300 to the noise reduction unit 1400. The noise reduction unit 1400 derives filters 1 to 6 for CH1 to CH6 respectively so that the observation wave of the vibration observation device 130 is satisfactorily removed from the composite waves for CH1 to CH6.

Specifically, the noise reduction unit 1400 has such a function that, when a vibration occurs at a vibration source, it learns how much time differences there are between the arrival times of the observation waves of the microphones 110B, 110D and 110F, which are the reference microphones, and the arrival time of the observation wave of the vibration observation device 130, and by what factor the observation waves are attenuated or amplified.

The noise reduction unit 1400 estimates vibration waves occurring at the microphones 110B, 110D and 110F, respectively, caused by the vibration of the vibration source based on the observation wave of the vibration observation device 130 by using learning results obtained by this function, and thereby generates the filters 1 to 6. That is, the noise reduction unit 1400 generates the filters 1 to 6 based on conventional processing such as an independent component analysis.

Note that the differences between the arrival times of the observation waves of the microphones 110B, 110D and 110F and the arrival time of the observation wave of the vibration observation device 130, which are observed when a vibration occurs at a vibration source, as well as the factor by which the observation waves are attenuated or amplified change depending on the distances between the centers of the respective microphones 110B, 110D and 110F and the center of the vibration observation device 130. That is, the differences between the arrival times of the observation waves of the microphones 110B, 110D and 110F and the arrival time of the observation wave of the vibration observation device 130, which are observed when a vibration occurs at a vibration source, as well as the factor by which the observation waves are attenuated or amplified do not change depending on the location of the vibration source. However, if the distance between each of the microphones 110B, 110D and 110F and the vibration observation device 130 is large, the difference between the arrival times of the vibration of the vibration source become larger and the extent of the attenuation or amplification also becomes larger. Therefore, the learning accuracy in the noise reduction unit 1400 deteriorates. As a result, the accuracy of the filters 1 to 6, which are generated by the noise reduction unit 1400, deteriorates.

Therefore, to improve the accuracy of the filters 1 to 6, it is desirable to make the distance between each of the microphones 110B, 110D and 110F and the vibration observation device 130 smaller. Therefore, in this exemplary embodiment, the center of the vibration observation device 130 is located at roughly the center of gravity of a regular triangle that is formed by connecting the center of the microphone 110B, which is the reference microphone for CH1 and CH2, the center of the microphone 110D, which is the reference microphone for CH3 and CH4, and the center of the microphone 110F, which is the reference microphone for CH5 and CH6. In this way, it is possible to make the distances between the centers of the microphones 110B, 110D and 110F respectively and the center of the vibration observation device 130 roughly equal to each other and roughly the shortest, and thereby improve the accuracy of the filters 1 to 6.

The noise reduction unit 1400 performs a subtraction process of the vibration wave (filters 1 and 2), which is estimated to have occurred at the microphone 110B due to the vibration of the vibration source, from the composite wave for CH1 and CH2. Further, the noise reduction unit 1400 performs a subtraction process of the vibration wave (filters 3 and 4), which is estimated to have occurred at the microphone 110D due to the vibration of the vibration source, from the composite wave for CH3 and CH4. Furthermore, the noise reduction unit 1400 performs a subtraction process of the vibration wave (filters 5 and 6), which is estimated to have occurred at the microphone 110F due to the vibration of the vibration source, from the composite wave for CH5 and CH6. In this exemplary embodiment, the accuracy of the filters 1 to 6 can be improved as described above. Therefore, it is possible to satisfactorily subtract the vibration wave (noise component) caused by the vibration of the vibration source from the composite waves for CH1 to CH6 with high accuracy. Therefore, the sound collecting device 1 in accordance with this exemplary embodiment can acquire the target sound with high accuracy.

In addition, since the distance between each of the microphones 110B, 110D and 110F respectively and the vibration observation device 130 is small, the length (length in the time axis direction of the estimated vibration wave) of the filters 1 to 6 can be made shorter. Therefore, it is possible to reduce the calculation amount of the noise reduction unit 1400. As a result, it is possible to make the calculation processing of the noise reduction unit 1400 faster and simpler.

Further, since the distances between the microphones 110B, 110D and 110F respectively and the vibration observation device 130 are roughly equal to each other, the accuracy of the array process, which is performed later, is less likely to deteriorate. That is, if the vibration observation device 130 is disposed near the microphone 110B, for example, the vibration observation device 130 is located far away from the microphone 110D or 110F. As a result, the accuracy of the filters 3 to 6, which are generated depending on the distances between the vibration observation device 130 and the microphone 110D or 110F, deteriorates. As a result, the noise component cannot be removed from the composite waves for CH3 to CH6 with high accuracy, and therefore the accuracy of the array process performed later also deteriorates.

Further, in this exemplary embodiment, the center of gravity of the regular triangle that is formed by connecting the centers of the microphones 110B, 110D and 110F coincides with the center of gravity of the regular triangle that is formed by connecting the centers of the microphones 110A, 110C and 110E.

In other words, the center of the vibration observation device 130 is located at roughly the center of gravity C2 of the regular triangle connecting the centers of the microphones 110A, 110C and 110E. Therefore, the distance between the vibration observation device 130 and the microphone 110A, the distance between the vibration observation device 130 and the microphone 110C, and the distance between the vibration observation device 130 and the microphone 110E are roughly equal to each other and are roughly the shortest.

That is, since the distances between the vibration observation device 130 and the microphone 110A or 110C become roughly equal to each other and roughly the shortest, the learning accuracy of the noise reduction unit 1400 for generating the filters 1 and 2 for CH1 and CH2 can be improved. Further, since the distances between the vibration observation device 130 and the microphone 110A or 110E become roughly equal to each other and roughly the shortest, the learning accuracy of the noise reduction unit 1400 for generating the filters 3 and 4 for CH3 and CH4 can be improved. Furthermore, since the distances between the vibration observation device 130 and the microphone 110C or 110E become roughly equal to each other and roughly the shortest, the learning accuracy of the noise reduction unit 1400 for generating the filters 5 and 6 for CH5 and CH6 can be improved. As a result, it is possible to remove the noise components from the composite waves for CH1 to CH6 with higher accuracy.

The noise reduction unit 1400 performs an array process on the composite waves for CH1 to CH6 on which the subtraction processes were performed. That is, there are overlapping areas in the directivities of CH1 to CH6 as described above. To carry out a blind process for these overlapping areas, a conventional sound source separation process such as a beam-forming and a principal component analysis is performed on the composite waves for CH1 to CH6 from which the noise components were removed. In this way, the sound collecting device 1 in accordance with this exemplary embodiment can acquire a target sound coming from any of the entire 360° directions with high accuracy. The noise reduction unit 1400 outputs the composite waves for CH1 to CH6 on which the blind process was performed to the D/A conversion unit 1500.

The composite waves for CH1 to CH6 on which the blind process was performed are input from the noise reduction unit 1400 to the D/A conversion unit 1500. The D/A conversion unit 1500 converts the composite waves for CH1 to CH6 on which the blind process was performed from a digital form into an analog form. Then, the D/A conversion unit 1500 outputs the D/A-converted composite waves for CH1 to CH6, for example, to a microphone (not shown). Note that when the composite waves for CH1 to CH6 are output from the noise reduction unit 1400 to a voice recognition system, the D/A conversion unit 1500 may be omitted.

Exemplary embodiments of a microphone unit and a sound collecting device in accordance with the present invention have been explained so far. However, the present invention is not limited to the above-described configurations, and they can be modified without departing from the technical idea of the present invention.

Figure 7:
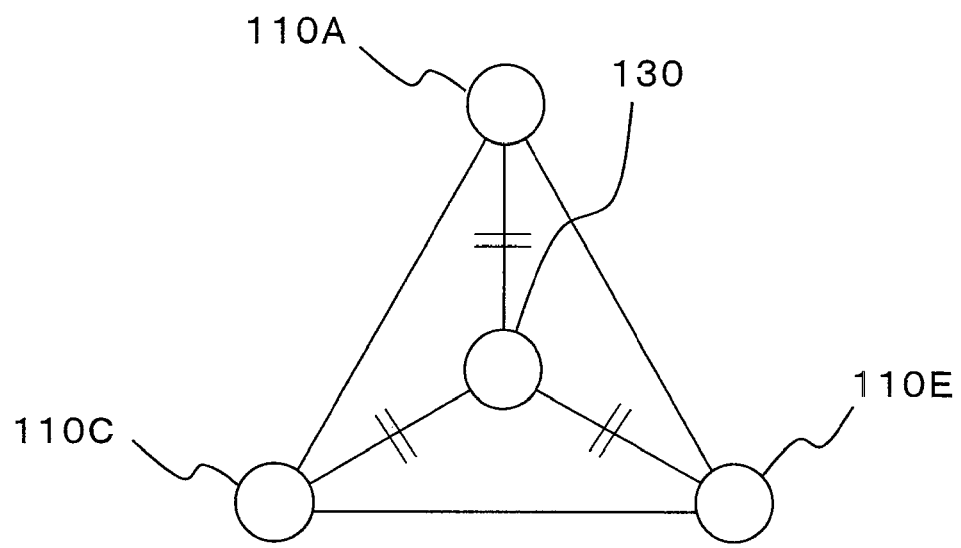
FIG. 7 is a figure for explaining characteristics of a position at which a vibration observation device is disposed in a microphone unit in accordance with another exemplary embodiment of the present invention.

For example, although six microphones 110A to 110F are provided in the above-described exemplary embodiment, the present invention is not limited to this configuration. For example, as shown in FIG. 7, the present invention can be also applied in a similar manner to a configuration in which the microphones 110B, 110D and 110F are omitted. Even in this case, the vibration observation device 130 is disposed at roughly the center of gravity of a regular triangle that is formed by connecting the centers of the microphones 110A, 110C and 110E. Incidentally, the microphone 110A or 110C is defined as the reference microphone for CH1 and CH2. The microphone 110A or 110E is defined as the reference microphone for CH3 and CH4. The microphone 110C or 110E is defined as the reference microphone for CH5 and CH6. Even in the arrangement of the microphones 110A, 110C and 110E like this, the distances between the reference microphones and the vibration observation device 130 are roughly equal to each other and are roughly the shortest. Therefore, this arrangement also provides advantageous effects similar to those of the microphone unit and the sound collecting device in accordance with the above-described exemplary embodiment. In short, although the microphones are arranged in such a manner that a regular triangle is formed by connecting the centers of the microphones in this exemplary embodiment, the plurality of microphones may be also arranged in such a manner that a circle or a polygon is formed as long as the above-described advantageous effects are achieved.

Figure 8:
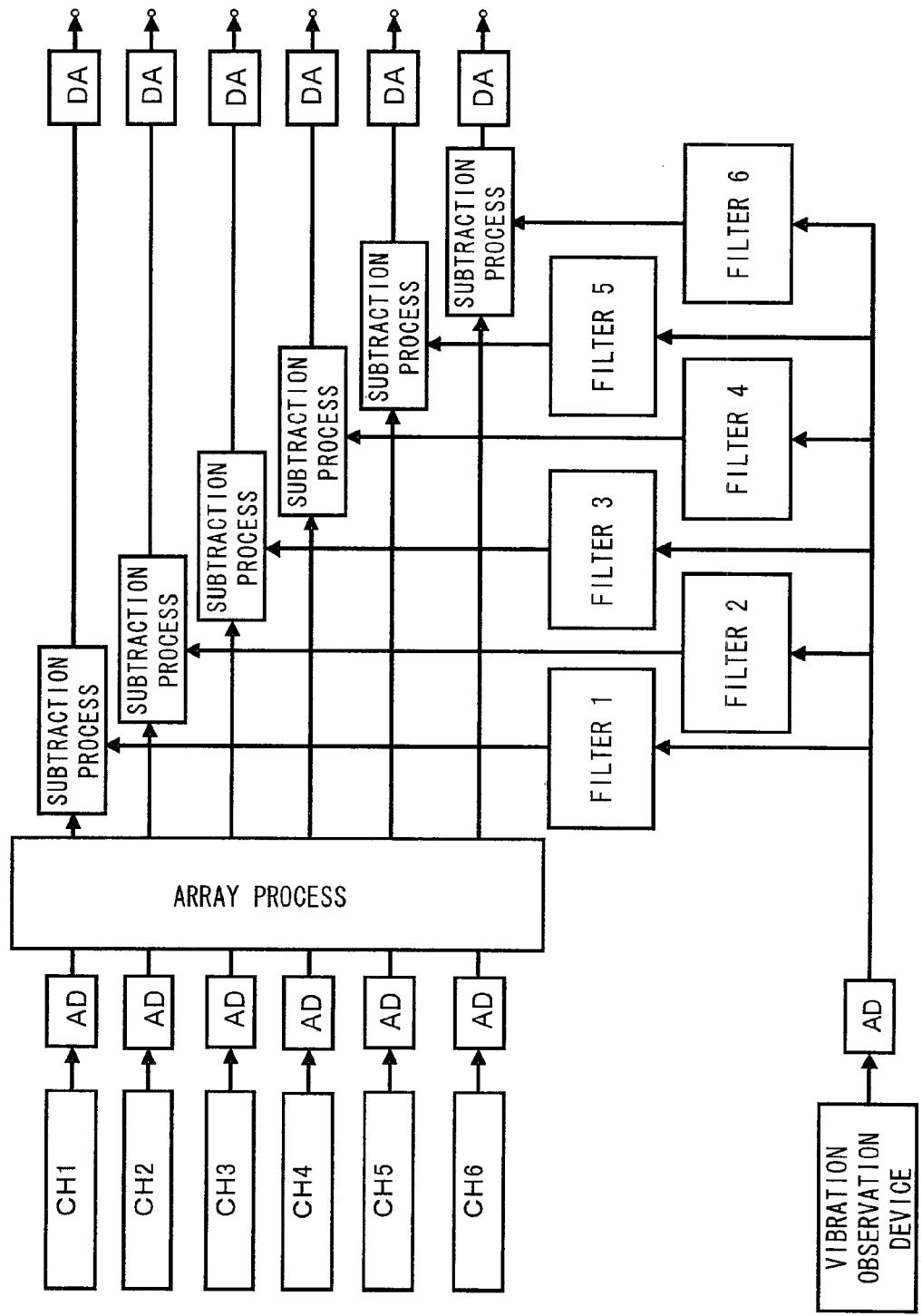
FIG. 8 shows a different process flow of a noise reduction unit in a sound collecting device in accordance with an exemplary embodiment of the present invention.

The array process is carried out after the noise components are removed from the composite waves for CH1 to CH6 in the above-described exemplary embodiment. However, as shown in FIG. 8, the array process may be carried out on the composite waves for CH1 to CH6 before the noise components may be removed from the composite waves.

Although the vibration observation device 130 is mounted on the upper surface of the microphone substrate 120 in the above-described exemplary embodiment, the vibration observation device 130 may be mounted on the under surface of or inside the microphone substrate 120.

Although the composite waves for CH1 to CH6 from which the noise components were removed are output to a microphone or a voice recognition system in the above-described exemplary embodiment, the composite waves can be output to any device or system.

Although the sound collecting device is installed in a robot in the above-described exemplary embodiment, the sound collecting device can be installed in any device.

Industrial Applicability

The present invention is used as a microphone unit and a sound collecting device capable of acquiring a target sound with high accuracy.

REFERENCE SIGNS LIST

1 SOUND COLLECTING DEVICE
100 MICROPHONE UNIT
110A to 110F MICROPHONE UNIT
120 MICROPHONE SUBSTRATE
130 VIBRATION OBSERVATION DEVICE
1000 PROCESSING UNIT
1100 AMPLIFICATION UNIT
1200 COMPOSITE WAVE GENERATION UNIT
1300 A/D CONVERSION UNIT
1400 NOISE REDUCTION UNIT
1500 D/A CONVERSION UNIT
C1, C2 CENTER OF GRAVITY
L1 to L3 IMAGINARY STRAIGHT-LINE

The invention claimed is:

1. A microphone device comprising:
    a plurality of microphones;
    a microphone substrate on which the plurality of microphones are mounted; and
    an acceleration sensor disposed at roughly a center of gravity of a shape that is formed by connecting centers of the plurality of microphones when the microphone device is operational,
    wherein the shape that is formed by connecting the centers of the plurality of microphones approximates a polygon.

2. The microphone device according to claim 1, wherein the acceleration sensor is mounted on the microphone substrate.

3. The microphone device according to claim 1, wherein the shape that is formed by connecting the centers of the plurality of microphones approximates a regular polygon.

4. The microphone device according to claim 3, wherein the regular polygon is a regular triangle.

5. The microphone device according to claim 4, wherein an additional microphone is disposed at a middle place between a microphone forming a first vertex and a microphone forming a second vertex.

6. A sound collecting device comprising:
    a microphone device according to claim 1; and
    a processing device that processes an observation signal supplied from the plurality of microphones of the microphone device.

\* \* \* \* \*